United States Patent
Lee et al.

(10) Patent No.: US 11,052,858 B2
(45) Date of Patent: Jul. 6, 2021

(54) BEHAVIOR CONTROL AIRBAG APPARATUS

(71) Applicant: HYUNDAI MOBIS CO., LTD., Seoul (KR)

(72) Inventors: Seok Min Lee, Yongin-si (KR); Ji Woon Song, Yongin-si (KR); Byung Ho Min, Yongin-si (KR); Sang Won Hwangbo, Yongin-si (KR); Do Hyoung Kim, Yongin-si (KR); Hae Kwon Park, Yongin-si (KR); Rae Ick Jang, Yongin-si (KR); Kyu Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 16/662,189

(22) Filed: Oct. 24, 2019

(65) Prior Publication Data
US 2020/0148154 A1   May 14, 2020

(30) Foreign Application Priority Data
Nov. 12, 2018   (KR) .......................... 10-2018-0138136

(51) Int. Cl.
*B60R 21/207*   (2006.01)
*B60R 21/233*   (2006.01)

(52) U.S. Cl.
CPC .......... *B60R 21/207* (2013.01); *B60R 21/233* (2013.01); *B60R 2021/23308* (2013.01); *B60R 2021/23324* (2013.01)

(58) Field of Classification Search
CPC ................ B60R 21/207; B60R 21/233; B60R 2021/23308; B60R 2021/23324; B60R 2021/23146; B60R 2021/23153; B60N 2/42754; B60N 2/4235; B60N 2/914
See application file for complete search history.

(56) References Cited

U.S. PATENT DOCUMENTS

| | | | | |
|---|---|---|---|---|
| 9,738,187 | B1 * | 8/2017 | McCoy | B60N 2/62 |
| 2001/0011810 | A1 * | 8/2001 | Saiguchi | B60N 2/885 |
| | | | | 280/728.1 |
| 2005/0173898 | A1 * | 8/2005 | Yoshikawa | B60R 21/207 |
| | | | | 280/729 |
| 2013/0056964 | A1 * | 3/2013 | Yamashita | B60R 21/207 |
| | | | | 280/730.1 |
| 2014/0306497 | A1 * | 10/2014 | Fukawatase | B60N 2/42763 |
| | | | | 297/216.1 |
| 2014/0361520 | A1 * | 12/2014 | Hirako | B60N 2/42763 |
| | | | | 280/729 |
| 2017/0028960 | A1 * | 2/2017 | Kobayashi | B60R 21/233 |
| 2017/0043681 | A1 * | 2/2017 | Seiller | B60N 2/914 |
| 2017/0164747 | A1 * | 6/2017 | Zouzal | A47C 7/14 |
| 2019/0299902 | A1 * | 10/2019 | Nagasawa | B60N 2/002 |

* cited by examiner

*Primary Examiner* — Drew J Brown
(74) *Attorney, Agent, or Firm* — H.C. Park & Associates, PLC

(57) ABSTRACT

A behavior control airbag apparatus including: a floating cushion disposed in a seating part of a seat, and configured to push up a passenger on the seating part while deployed by gas injected by an inflator; and a behavior cushion disposed eccentrically on an outboard side of the floating cushion, and configured to push up the outboard side of the passenger according to the injection of the gas, such that the passenger is inclined to an inboard side.

9 Claims, 8 Drawing Sheets

BEHAVIOR CONTROL AIRBAG APPARATUS

CROSS-REFERENCE TO RELATED APPLICATION

This application claims priority from and the benefit of Korean Patent Application No. 10-2018-0138136, filed on Nov. 12, 2018, which is hereby incorporated by reference for all purposes as if set forth herein.

BACKGROUND

Field

Exemplary embodiments relate to behavior control airbag apparatuses, and more particularly, to behavior control airbag apparatuses which can rapidly and easily incline a passenger to an inboard side in case of a side-on collision.

Discussion of the Background

In general, a vehicle has airbags installed at various places. A side airbag is installed in a seat of the vehicle. Between a side surface of the seat and the side airbag, a behavior control airbag apparatus is installed. The behavior control airbag apparatus is deployed prior to the side airbag. The behavior control airbag apparatus is deployed to press the shoulder of a passenger such that the upper body of the passenger is inclined to an inboard side (toward the widthwise center of the vehicle body).

In the related art, however, since the behavior control airbag apparatus pushes the upper body of the passenger such that the passenger is inclined to the inboard side, body parts below the chest (for example, the waist, the pelvis, the thigh and the like) are hardly moved to the inboard side. Therefore, the body parts below the chest may not be effectively protected in case of a side-on collision of the vehicle.

Since the behavior control airbag apparatus presses the shoulder of the passenger to the inboard side with the passenger's body placed against a seating part and a back part of the seat, the behavior speed of the passenger may be decreased, and the passenger may be inclined less to the inboard side. When the passenger's behavior to the inboard side is delayed or the passenger is inclined less to the inboard side, it may be difficult to safely protect a lateral part of the passenger.

Therefore, there is a need for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a behavior control airbag apparatus which can rapidly and easily incline a passenger to an inboard side in case of a side-on collision.

In an embodiment, a behavior control airbag apparatus may include: a floating cushion disposed in a seating part of a seat, and configured to push up a passenger on the seating part while deployed by gas injected by an inflator; and a behavior cushion disposed eccentrically on an outboard side of the floating cushion, and configured to push up the outboard side of the passenger according to the injection of the gas, such that the passenger is inclined to an inboard side.

The behavior control airbag apparatus may further include a diaphragm configured to partition the floating cushion and the behavior cushion.

The diaphragm may have one or more communication holes through which the floating cushion and the behavior cushion communicate with each other, and the communication holes may be disposed eccentrically on the outboard side.

The height of the behavior cushion on the outboard side may be larger than the height of behavior cushion on the inboard side.

The top of the behavior cushion may be inclined downward from the outboard side to the inboard side.

The floating cushion and the behavior cushion may be disposed on the rear side of the seating part.

The inflator may be connected to the outboard side of the floating cushion.

The floating cushion may be deployed in a rectangular plate shape.

The floating cushion may include one floating chamber.

The floating cushion may include a plurality of floating chambers partitioned by a partitioning part in a top-to-bottom direction.

In accordance with the embodiment of the disclosure, as the floating cushion is deployed, the back of the passenger may be slightly spaced apart from the back part of the seat, and the pelvis of the passenger may be floated from the seating part of the seat. Thus, when the behavior cushion is deployed, the passenger may be rapidly and easily inclined to the inboard side of the vehicle body by the inflation force of the behavior cushion.

Furthermore, since the body of the passenger is moved to the inboard side with the passenger's pelvis floated, the pelvis of the passenger may be positioned farther from the side surface of the vehicle. Therefore, the lower body of the passenger can be protected more safely.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Hereinafter, a behavior control airbag apparatus for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

Figure 1:
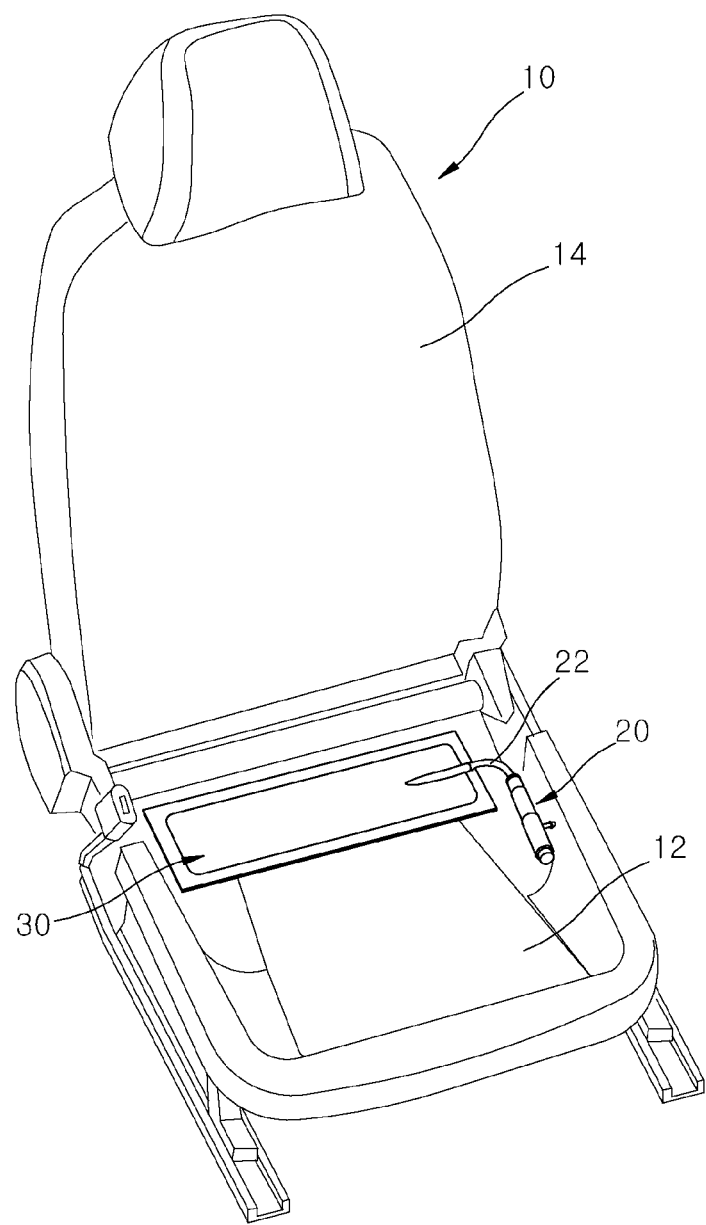
FIG. 1 is a perspective view illustrating that a behavior control airbag apparatus in accordance with an embodiment of the disclosure is installed in a seat.
Figure 2:
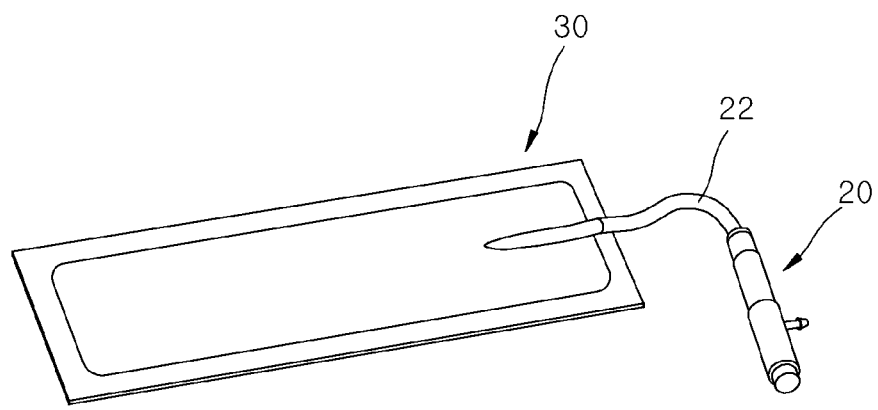
FIG. 2 is a perspective view illustrating the behavior control airbag apparatus in accordance with the embodiment of the disclosure.
Figure 3:
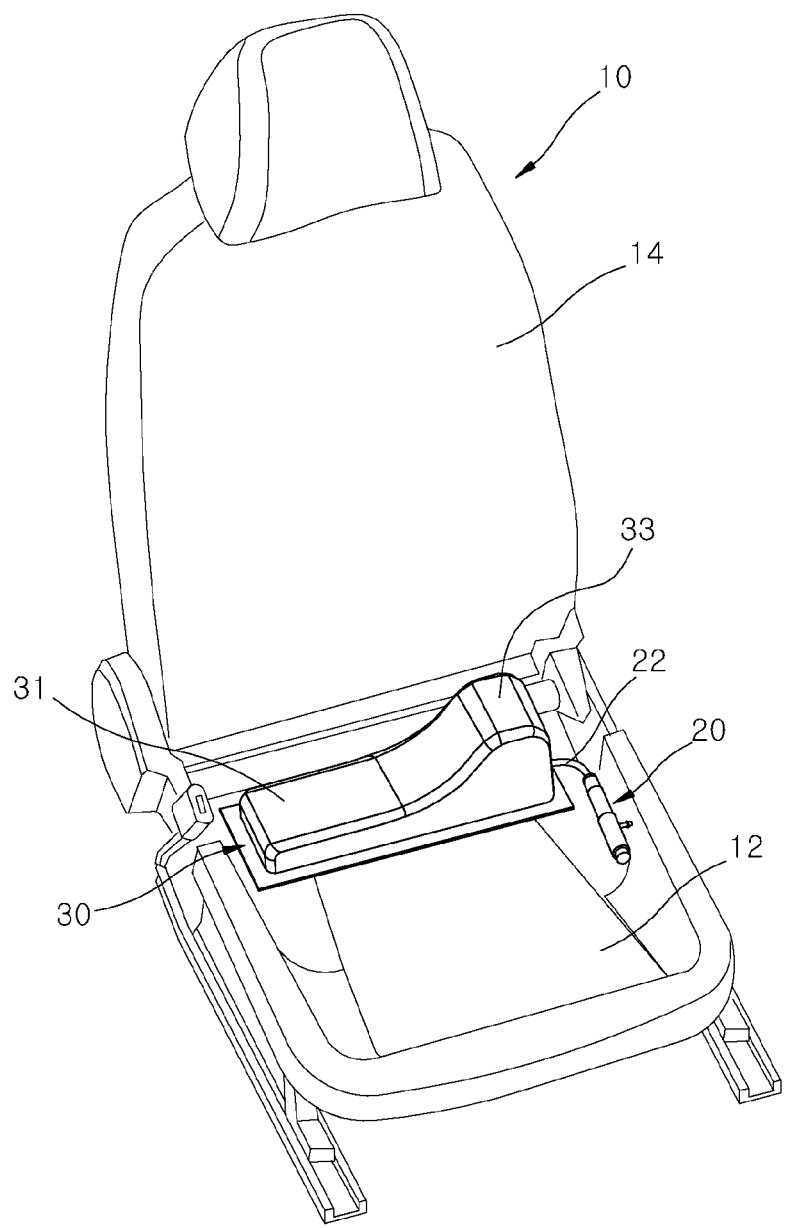
FIG. 3 is a perspective view illustrating that the behavior control airbag apparatus in accordance with the embodiment of the disclosure is deployed in the seat.
Figure 4:
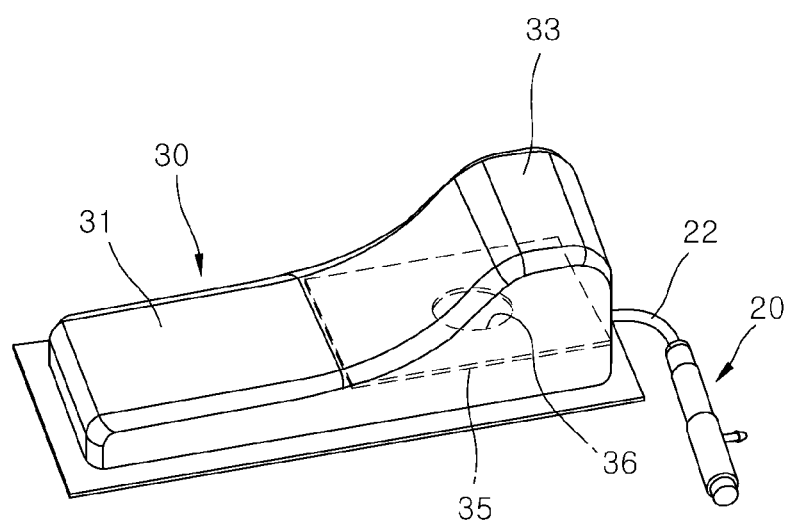
FIG. 4 is a perspective view illustrating that the behavior control airbag apparatus in accordance with the embodiment of the disclosure is deployed.
Figure 5:
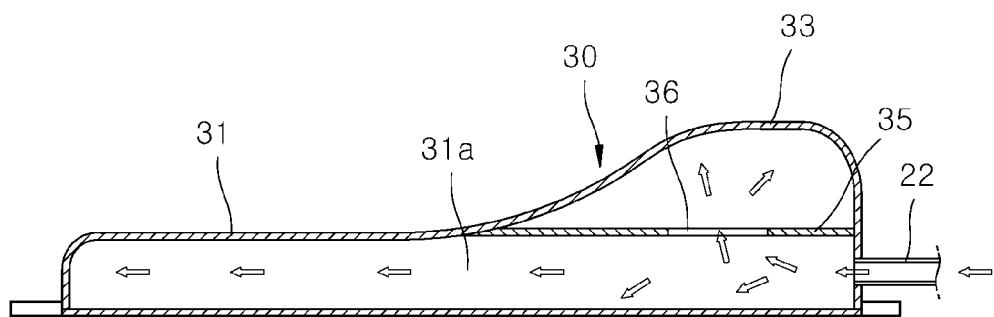
FIG. 5 is a cross-sectional view illustrating that the behavior control airbag apparatus in accordance with the embodiment of the disclosure is deployed.

FIG. 1 is a perspective view illustrating that a behavior control airbag apparatus in accordance with an embodiment of the disclosure is installed in a seat, FIG. 2 is a perspective view illustrating the behavior control airbag apparatus in accordance with the embodiment of the disclosure, FIG. 3 is a perspective view illustrating that the behavior control airbag apparatus in accordance with the embodiment of the disclosure is deployed in the seat, FIG. 4 is a perspective view illustrating that the behavior control airbag apparatus in accordance with the embodiment of the disclosure is deployed, and FIG. 5 is a cross-sectional view illustrating that the behavior control airbag apparatus in accordance with the embodiment of the disclosure is deployed.

Referring to FIGS. 1 to 5, the behavior control airbag apparatus in accordance with the embodiment of the disclosure includes a floating cushion 31 and a behavior cushion 33.

The floating cushion 31 and the behavior cushion 33 constitute an airbag cushion 30 of the behavior control airbag apparatus. Since the airbag cushion 30 of the behavior control airbag apparatus has a much smaller size than a side airbag (not illustrated), the side airbag is deployed after the airbag cushion 30 of the behavior control airbag apparatus is completely deployed.

The behavior control airbag apparatus may be installed in various seats 10 such as a driver seat, a passenger seat and a rear seat of the vehicle. A side airbag apparatus is installed on the outboard side of the seat 10. A laser sensor is installed on a side surface of a vehicle body 1 (see FIGS. 7 and 8), and serves to sense a side-on collision of the vehicle in advance. The behavior control airbag apparatus is disposed inside a cover (not illustrated) of the seat 10. When a passenger H (see FIG. 7) is seated in a seating part 12 of the seat 10, the behavior control airbag apparatus is disposed at the bottom of the pelvis of the passenger H.

Outboard indicates both sides of the vehicle body 1 in the widthwise direction, and inboard indicates the center of the vehicle body 1 in the widthwise direction.

The floating cushion 31 is disposed in the seating part 12 of the seat 10, and pushes up the passenger H to be floated on the seating part 12 while deployed by gas injected by an inflator 20. The seating part 12 of the seat 10 is a portion of the seat, on which the passenger H is seated. The floating cushion 31 is disposed in the seating part 12 so as to be parallel to the widthwise direction of the vehicle body 1. As the floating cushion 31 is deployed, the body of the passenger H is separated from the seating part 12 and a back part 14. Thus, a contact area between the passenger H and the seat 10 can be reduced.

The behavior cushion 33 is disposed eccentrically on the outboard side of the floating cushion 31. As gas is injected, the behavior cushion 33 pushes up the outboard side of the passenger H 1 such that the passenger H is inclined to the inboard side. As the floating cushion 31 is deployed, the back of the passenger H is slightly separated from the back part 14, and the pelvis of the passenger H is floated on the seating part 12 of the seat 10. Therefore, when the behavior cushion 33 is deployed, the passenger H may be more rapidly and easily inclined to the inboard side of the vehicle body 1 due to the inflation force of the behavior cushion 33.

Therefore, since the head, upper body and lower body of the passenger H are further moved to the inboard side of the vehicle body 1, the passenger H can be protected more effectively in case of a side-on collision of the vehicle. Furthermore, since the body of the passenger H is moved to the inboard side with the passenger's pelvis floated, the pelvis of the passenger H may be positioned farther from the side surface of the vehicle. Therefore, the lower body and pelvis (parts below the chest) of the passenger H can be protected more safely.

Since the passenger H is inclined to the inboard side by the floating cushion 31 and the behavior cushion 33, a space in which the side airbag can be deployed may be sufficiently secured on the outboard side of the seat 10. Therefore, it is possible to prevent a situation in which the side airbag is deployed while distorted or is not deployed.

The behavior control airbag apparatus further includes a diaphragm 35 for partitioning the floating cushion 31 and the behavior cushion 33. The diaphragm 35 has one or more communication holes 36 through which the floating cushion 31 and the behavior cushion 33 communicate with each other, and the communication holes 36 are disposed eccentrically on the outboard side. Since the communication holes 36 are formed in the diaphragm 35, gas injected into the floating cushion 31 may flow into the behavior cushion 33 through the communication hole 36. Since the communication hole 36 is formed eccentrically on the outboard side in the diaphragm 35, a gas flow path between a gas injection part and the behavior cushion 33 may be shortened. Furthermore, since the behavior cushion 33 is deployed after the floating cushion 31 is deployed, the passenger H may be first floated on the seat 10 and then inclined to the inboard side.

The gas may be separately injected into each of the floating cushion 31 and the behavior cushion 33. In this case, the diaphragm 35 for partitioning the floating cushion 31 and the behavior cushion 33 may have no communication holes 36 formed therein.

The height of the behavior cushion 33 on the outboard side is larger than the height of the behavior cushion 33 on the inboard side. Thus, when the behavior cushion 33 is deployed, the outboard side of the pelvis of the passenger H is floated relatively high. Therefore, the passenger H may be rapidly inclined to the inboard side.

The top of the behavior cushion 33 is inclined downward from the outboard side to the inboard side. When the behavior cushion 33 is completely deployed, the behavior cushion 33 has a right triangle shape. Therefore, since the top of the behavior cushion 33 obliquely pushes up the pelvis of the passenger H while supporting the entire pelvis of the passenger H, the passenger H may be more rapidly and easily inclined to the inboard side.

The behavior cushion 33 and the floating cushion 31 are disposed on the rear side of the seating part 12. Thus, when the passenger H is seated on the seating part 12 of the seat 10, the pelvis of the passenger H is positioned at the top of the behavior cushion 33 and the floating cushion 31. Therefore, as the behavior cushion 33 and the floating cushion 31 are deployed, the pelvis of the passenger H may be floated on the seating part 12.

The inflator 20 is connected to the outboard side of the floating cushion 31. At this time, the inflator 20 is connected to the outboard side of the floating cushion 31 through a connection hose 22. The inflator 20 may be disposed on the outboard side of the seating part 12. Since the inflator 20 is connected to the outboard side of the floating cushion 31 and the behavior cushion 33 and the communication hole 36 are disposed on the outboard side of the floating cushion 31, the gas flow path between the gas injection part (not illustrated) of the floating cushion 31 and the behavior cushion 33 is relatively shortened. Therefore, since the behavior cushion 33 is deployed more rapidly, the reaction velocity of the behavior control airbag apparatus in case of a side-on collision of the vehicle can be improved.

When the floating cushion 31 is deployed, the floating cushion 31 is deployed in a rectangular plate shape. Since the floating cushion 31 is deployed in a rectangular plate shape, the entire pelvis of the passenger H may be floated to the same height. When the floating cushion 31 is deployed, the outboard side of the floating cushion 31 may be deployed relatively high.

The floating cushion 31 includes one floating chamber 31a. Therefore, when gas is injected into the floating cushion 31, the floating cushion 31 is deployed while expanded at the same time.

The floating cushion 31 floats the passenger H, and the behavior cushion 33 inclines the passenger H. Since the floating cushion 31 and the behavior cushion 33 are deployed for a very short time, the floating cushion 31 and the behavior cushion 33 incline the passenger H to the inboard side while substantially floating the passenger H.

Figure 6:
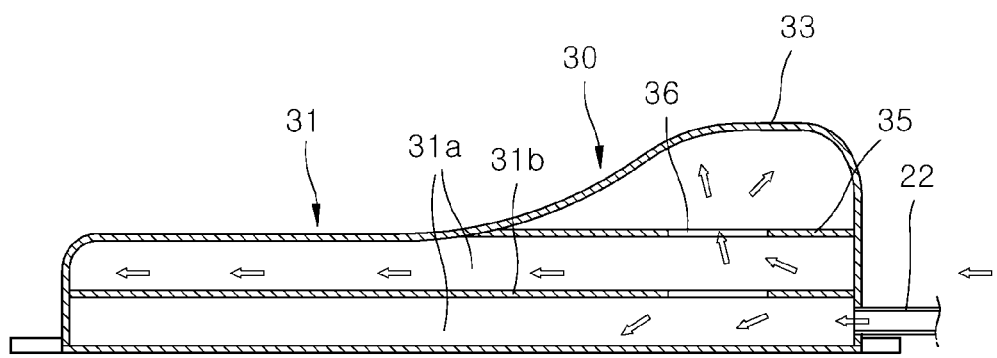
FIG. 6 is a cross-sectional view illustrating that a behavior control airbag apparatus in accordance with another embodiment of the disclosure is deployed.

FIG. 6 is a cross-sectional view illustrating that a behavior control airbag apparatus in accordance with another embodiment of the disclosure is deployed.

Referring to FIG. 6, the floating cushion 31 includes a plurality of floating chambers 31a partitioned by a partitioning part 31b in a top-to-bottom direction. At this time, one or more diaphragms 35 are horizontally disposed. The number of partitioning parts 31b is decided according to the number of the floating chambers 31a. Each of the partitioning parts 31b has a communication hole 36 formed therein. Since the floating cushion 31 includes the plurality of floating chambers 31a partitioned in the top-to-direction direction, the floating cushion 31 may be sequentially deployed upward.

The operation of the behavior control airbag apparatus in accordance with the embodiment of the disclosure, which is configured as described above, will be described.

Figure 7:
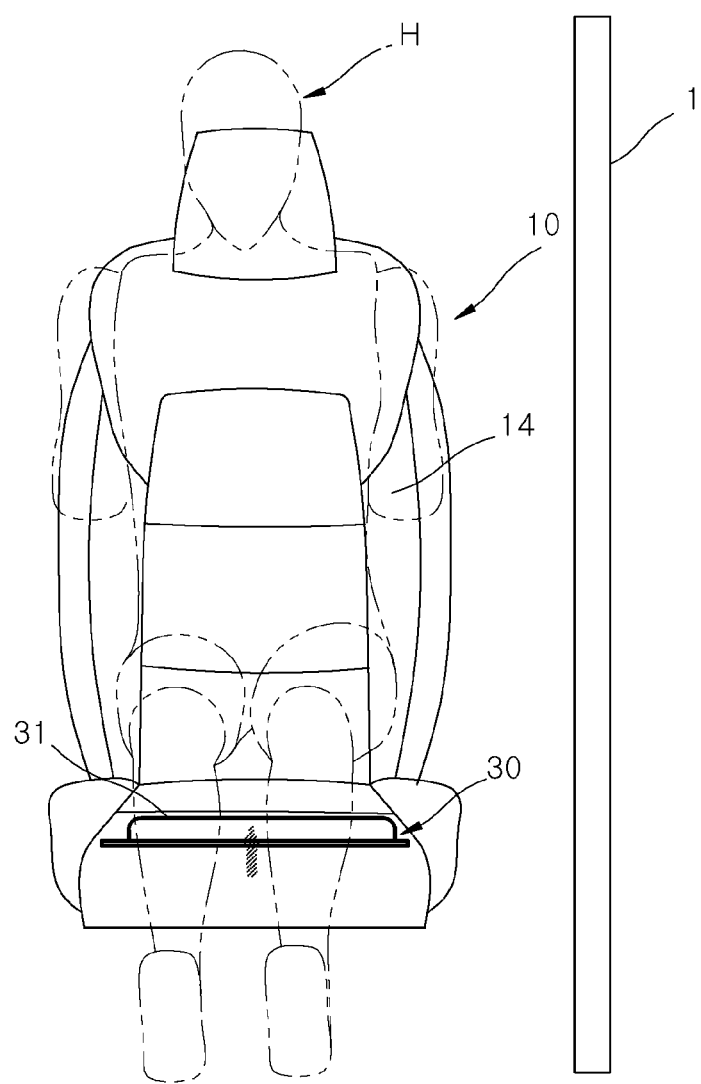
FIG. 7 is a front view illustrating that the floating cushion is deployed in the behavior control airbag apparatus in accordance with the embodiment of the disclosure.
Figure 8:
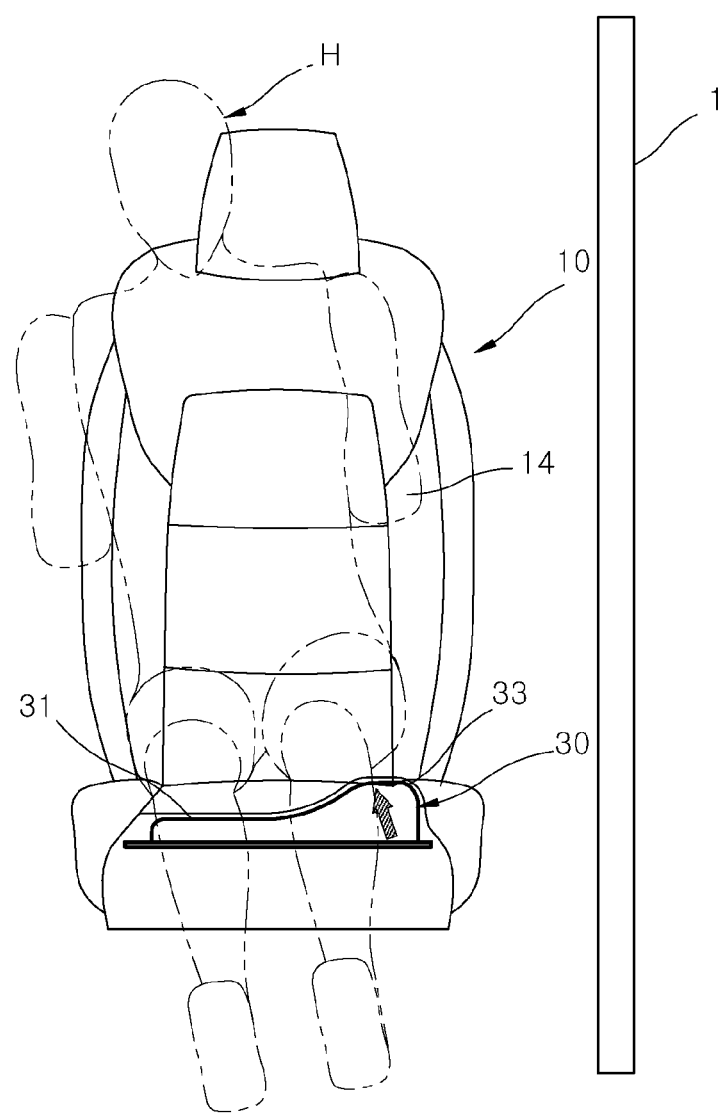
FIG. 8 is a front view illustrating that the floating cushion and the behavior cushion are deployed in the behavior control airbag apparatus in accordance with the embodiment of the disclosure.

FIG. 7 is a front view illustrating that the floating cushion is deployed in the behavior control airbag apparatus in accordance with the embodiment of the disclosure, and FIG. 8 is a front view illustrating that the floating cushion and the behavior cushion are deployed in the behavior control airbag apparatus in accordance with the embodiment of the disclosure.

Referring to FIGS. 7 and 8, the laser sensor measures a distance to a neighboring vehicle, and senses a side-on collision of the vehicle in advance. When the side-on collision of the vehicle is sensed through the laser sensor, the inflator 20 is driven.

As gas generated by the inflator 20 is injected into the floating cushion 31, the floating cushion 31 is deployed upward while expanded in a rectangular plate shape. As the floating cushion 31 is deployed upward, the pelvis of the passenger H is pushed upward. When the passenger H is floated upward, the back of the passenger H is slightly spaced apart from the back part 14, and the pelvis of the passenger H is spaced apart from the seating part 12 of the seat 10.

The gas of the floating cushion 31 flows into the behavior cushion 33 through the communication hole 36. Since the behavior cushion 33 is disposed eccentrically on the outboard side of the floating cushion 31 and inclined downward to the inboard side, the pelvis of the passenger H is obliquely floated. Therefore, since the head, upper body and lower body of the passenger H are inclined to the inboard side of the vehicle body 1, the passenger H may be protected more effectively in case of a side-on collision of the vehicle.

Since the body of the passenger H is moved to the inboard side with the passenger's pelvis floated, the pelvis of the passenger H may be positioned farther from the side surface of the vehicle. Therefore, the lower body of the passenger H can be protected more safely.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A behavior control airbag apparatus comprising:
a floating cushion disposed in a seating part of a seat, and configured to push up a passenger on the seating part while deployed by gas injected by an inflator;
a behavior cushion disposed eccentrically on an outboard side of the floating cushion, and configured to push up the outboard side of the passenger according to the injection of the gas, such that the passenger is inclined to an inboard side; and
a diaphragm configured to partition the floating cushion and the behavior cushion.

2. The behavior control airbag apparatus of claim 1, wherein the diaphragm has one or more communication holes through which the floating cushion and the behavior cushion communicate with each other, and the communication holes are disposed eccentrically on the outboard side.

3. The behavior control airbag apparatus of claim 1, wherein the height of the behavior cushion on the outboard side is larger than the height of behavior cushion on the inboard side.

4. The behavior control airbag apparatus of claim 3, wherein the top of the behavior cushion is inclined downward from the outboard side to the inboard side.

5. The behavior control airbag apparatus of claim 1, wherein the floating cushion and the behavior cushion are disposed on the rear side of the seating part.

6. The behavior control airbag apparatus of claim 1, wherein the inflator is connected to the outboard side of the floating cushion.

7. The behavior control airbag apparatus of claim 1, wherein the floating cushion is deployed in a rectangular plate shape.

8. The behavior control airbag apparatus of claim 1, wherein the floating cushion comprises one floating chamber.

9. A behavior control airbag apparatus comprising:
- a floating cushion disposed in a seating part of a seat, and configured to push up a passenger on the seating part while deployed by gas injected by an inflator; and
- a behavior cushion disposed eccentrically on an outboard side of the floating cushion, and configured to push up the outboard side of the passenger according to the injection of the gas, such that the passenger is inclined to an inboard side,
- wherein the floating cushion comprises a plurality of floating chambers partitioned by a partitioning part in a top-to-bottom direction.

* * * * *